United States Patent
Cox et al.

(10) Patent No.: US 10,036,639 B1
(45) Date of Patent: Jul. 31, 2018

(54) SYSTEMS AND METHODS FOR DETERMINING AND DISPLAYING A ROUTE USING INFORMATION DETERMINED FROM A VEHICLE, USER FEEDBACK, AND A MOBILE ELECTRONIC DEVICE

(71) Applicant: METROMILE, INC., San Francisco, CA (US)

(72) Inventors: Evan Gabriel Turitz Cox, Pleasant Hill, CA (US); Muhammad Waliji, San Francisco, CA (US); Dan Richard Preston, Jr., San Francisco, CA (US); Jose Mercado, San Francisco, CA (US); Prashant Shukla, San Francisco, CA (US); Daniel Eric Goodman, Mountain View, CA (US); Allen Tran, Oakland, CA (US)

(73) Assignee: METROMILE, INC., San Francisco, CA (US)

( * ) Notice: Subject to any disclaimer, the term of this patent is extended or adjusted under 35 U.S.C. 154(b) by 132 days.

(21) Appl. No.: 14/842,753

(22) Filed: Sep. 1, 2015

Related U.S. Application Data

(60) Provisional application No. 62/044,978, filed on Sep. 2, 2014.

(51) Int. Cl.
*G01C 21/28* (2006.01)
*G01S 19/42* (2010.01)
(Continued)

(52) U.S. Cl.
CPC .............. *G01C 21/28* (2013.01); *G01C 21/16* (2013.01); *G01C 21/18* (2013.01); *G01C 21/36* (2013.01); *G01S 19/42* (2013.01)

(58) Field of Classification Search
CPC ........ G01C 21/28; G01C 21/16; G01C 21/18; G01C 21/36; G01C 21/42; G01C 21/26;
(Continued)

(56) References Cited

U.S. PATENT DOCUMENTS

| | | |
|---|---|---|
| 3,812,710 A | 5/1974 | Bauman et al. |
| 4,157,030 A | 6/1979 | Keely |

(Continued)

FOREIGN PATENT DOCUMENTS

| | | |
|---|---|---|
| GB | 2427498 A | 12/2006 |
| WO | WO 00/17610 A1 | 3/2000 |
| WO | WO 2016/005972 A1 | 1/2016 |

OTHER PUBLICATIONS

Hemminki, et al. Accelerometer-Based Transportation Mode. SenSys '13 Proceedings of the 11th ACM Conference on Embedded Networked Sensor Systems. Article No. 13. 2013. 14 pages.
(Continued)

*Primary Examiner* — Abby Y Lin
(74) *Attorney, Agent, or Firm* — Wilson Sonsini Goodrich & Rosati

(57) ABSTRACT

The present disclosure provides methods and systems for determined a route or distance traveled of a vehicle. A computer-implemented method for determining a route of a vehicle during a trip comprises obtaining sensor information from a vehicle and obtaining position information from the vehicle using a global positioning system (GPS) component. Next, a route of the vehicle may be determined based at least in part on the position information and route information provided by a user onboard the vehicle during the trip. For portions of the trip in which the GPS component is not available or accurate, at least a portion of a corresponding route segment may be determined using the sensor information without the position information.

24 Claims, 5 Drawing Sheets

(51) Int. Cl.
*G01C 21/18* (2006.01)
*G01C 21/36* (2006.01)
*G01C 21/16* (2006.01)

(58) Field of Classification Search
CPC ... G01C 21/34; G01C 21/3617; G07C 5/0808
See application file for complete search history.

(56) References Cited

U.S. PATENT DOCUMENTS

| | | | |
|---|---|---|---|
| 4,673,921 A | 6/1987 | Saito et al. | |
| 5,303,163 A | 4/1994 | Ebaugh et al. | |
| 5,550,738 A | 8/1996 | Bailey et al. | |
| 5,913,917 A | 6/1999 | Murphy | |
| 5,921,199 A | 7/1999 | Gross | |
| 6,087,965 A | 7/2000 | Murphy | |
| 6,122,572 A | 9/2000 | Yavnai | |
| 6,141,609 A | 10/2000 | Herdeg et al. | |
| 6,505,106 B1 | 1/2003 | Lawrence et al. | |
| 6,590,534 B1 | 7/2003 | Kroll et al. | |
| 6,694,258 B2 | 2/2004 | Johnson et al. | |
| 6,741,933 B1 | 5/2004 | Glass | |
| 7,532,974 B2 | 5/2009 | Sato et al. | |
| 7,937,278 B1 | 5/2011 | Cripe et al. | |
| 8,022,831 B1 | 9/2011 | Wood-Eyre | |
| 8,090,598 B2 | 1/2012 | Bauer et al. | |
| 8,180,293 B2 | 5/2012 | Jung et al. | |
| 8,280,752 B1 | 10/2012 | Cripe et al. | |
| 8,311,858 B2 | 11/2012 | Everett et al. | |
| 8,332,242 B1* | 12/2012 | Medina, III | G06Q 40/08 705/35 |
| 8,498,777 B2 | 7/2013 | Sanchez-Prieto Aler et al. | |
| 8,520,695 B1 | 8/2013 | Rubin et al. | |
| 8,527,140 B2 | 9/2013 | Schwartz et al. | |
| 8,560,216 B1 | 10/2013 | Kahn et al. | |
| 8,610,597 B2 | 12/2013 | Stefik et al. | |
| 8,793,062 B2 | 7/2014 | Fino | |
| 8,799,036 B1 | 8/2014 | Christensen et al. | |
| 8,816,879 B2 | 8/2014 | Stefik et al. | |
| 8,843,307 B1 | 9/2014 | Kolodziej | |
| 8,972,079 B2 | 3/2015 | Harumoto et al. | |
| 9,053,469 B1 | 6/2015 | Bohanek et al. | |
| 9,082,078 B2 | 7/2015 | Palmer et al. | |
| 9,230,425 B2 | 1/2016 | Hamaue et al. | |
| 9,372,831 B2 | 6/2016 | Harumoto et al. | |
| 9,812,015 B1 | 11/2017 | Cox et al. | |
| 9,846,977 B1 | 12/2017 | Cox et al. | |
| 2003/0229446 A1 | 12/2003 | Boscamp et al. | |
| 2004/0123837 A1 | 7/2004 | Rado | |
| 2004/0225557 A1 | 11/2004 | Phelan et al. | |
| 2005/0137757 A1 | 6/2005 | Phelan et al. | |
| 2005/0228553 A1 | 10/2005 | Tryon | |
| 2005/0240347 A1* | 10/2005 | Yang | G01C 21/16 701/500 |
| 2006/0042232 A1 | 3/2006 | Fulcher et al. | |
| 2006/0095301 A1 | 5/2006 | Gay | |
| 2006/0111835 A1 | 5/2006 | Baker et al. | |
| 2007/0083327 A1 | 4/2007 | Brice et al. | |
| 2007/0123270 A1 | 5/2007 | Casey | |
| 2007/0262855 A1 | 11/2007 | Zuta et al. | |
| 2007/0294030 A1 | 12/2007 | Jones | |
| 2008/0039988 A1 | 2/2008 | Estabrook et al. | |
| 2008/0091347 A1* | 4/2008 | Tashiro | G01C 21/30 701/448 |
| 2008/0252487 A1 | 10/2008 | McClellan et al. | |
| 2008/0312969 A1 | 12/2008 | Raines et al. | |
| 2009/0098907 A1 | 4/2009 | Huntzicker et al. | |
| 2009/0309759 A1 | 12/2009 | Williams | |
| 2010/0073158 A1 | 3/2010 | Uesaka et al. | |
| 2010/0073201 A1 | 3/2010 | Holcomb et al. | |
| 2010/0106416 A1* | 4/2010 | Yochum | G01C 21/165 701/469 |
| 2010/0161209 A1 | 6/2010 | Vaghefinazari | |
| 2010/0185479 A1 | 7/2010 | Brinton et al. | |
| 2010/0238009 A1 | 9/2010 | Cook et al. | |
| 2011/0022263 A1 | 1/2011 | Sanchez-Prieto Aler et al. | |
| 2011/0060600 A1 | 3/2011 | Fox et al. | |
| 2011/0106370 A1 | 5/2011 | Duddle et al. | |
| 2011/0137508 A1 | 6/2011 | Garcia Manchado | |
| 2011/0196601 A1 | 8/2011 | Miura et al. | |
| 2011/0301806 A1 | 12/2011 | Messier et al. | |
| 2011/0313647 A1 | 12/2011 | Koebler et al. | |
| 2012/0078671 A1 | 3/2012 | Mohebbi et al. | |
| 2012/0092190 A1 | 4/2012 | Stefik et al. | |
| 2012/0095792 A1 | 4/2012 | Stefik et al. | |
| 2012/0173075 A1 | 7/2012 | Mays | |
| 2012/0191242 A1 | 7/2012 | Outwater | |
| 2012/0209634 A1 | 8/2012 | Ling et al. | |
| 2013/0006674 A1 | 1/2013 | Bowne et al. | |
| 2013/0122928 A1 | 5/2013 | Pfluger | |
| 2013/0151037 A1 | 6/2013 | Harumoto et al. | |
| 2013/0245880 A1 | 9/2013 | McQuade | |
| 2013/0317665 A1 | 11/2013 | Fernandes et al. | |
| 2013/0344856 A1 | 12/2013 | Silver et al. | |
| 2014/0028477 A1 | 1/2014 | Michalske | |
| 2014/0067246 A1 | 3/2014 | Eldredge et al. | |
| 2014/0085109 A1 | 3/2014 | Stefik et al. | |
| 2014/0176348 A1 | 6/2014 | Acker, Jr. et al. | |
| 2014/0180727 A1 | 6/2014 | Freiberger et al. | |
| 2014/0236719 A1* | 8/2014 | Szostak | G06Q 30/0625 705/14.54 |
| 2014/0266594 A1 | 9/2014 | Reiser | |
| 2014/0309855 A1 | 10/2014 | Tran | |
| 2015/0019266 A1* | 1/2015 | Stempora | G06Q 40/08 705/4 |
| 2015/0187013 A1 | 7/2015 | Adams et al. | |
| 2015/0187019 A1 | 7/2015 | Fernandes et al. | |
| 2015/0226563 A1 | 8/2015 | Cox et al. | |
| 2015/0228129 A1 | 8/2015 | Cox et al. | |
| 2016/0033291 A1* | 2/2016 | Inoue | G01C 21/3617 701/408 |

OTHER PUBLICATIONS

Office action dated Apr. 18, 2016 for U.S. Appl. No. 14/177,192.
Office action dated Jun. 7, 2016 for U.S. Appl. No. 14/843,853.
Office action dated Jul. 1, 2016 for U.S. Appl. No. 14/842,736.
Office action dated Aug. 17, 2016 for U.S. Appl. No. 14/843,815.
Office action dated Sep. 12, 2016 for U.S. Appl. No. 14/177,188.
Office action dated Sep. 29, 2016 for U.S. Appl. No. 14/177,192.
Reddy, et al. Using mobile phones to determine transportation modes. ACM Trans. Sensor Netw. 6, 2, Article 13 (Feb. 2010), 27 pages. DOI:10.1145/1689239.1689243 http://doi.acm.org/10.1145/1689239.1689243.
Shoaib, et al. A Survey of Online Activity Recognition Using Mobile Phones. Sensors 2015, 15, 2059-2085; doi:10.3390/s150102059.
Stenneth, et al. Transportation Mode Detection using Mobile Phones and GIS Information. ACM SIGSPATIAL GIS '11, Nov. 1-4, 2011. Chicago, IL, USA. 54-63.
Office Action dated Jan. 27, 2017 for U.S. Appl. No. 14/843,853.
Office Action dated Nov. 28, 2016 for U.S. Appl. No. 14/842,736.
U.S. Appl. No. 14/842,736, filed Sep. 1, 2015, Cox et al.
U.S. Appl. No. 14/843,815, filed Sep. 2, 2015, Cox et al.
U.S. Appl. No. 14/843,853, filed Sep. 2, 2015, Cox et al.
Office action dated Apr. 23, 2015 for U.S. Appl. No. 14/177,188.
Office action dated Sep. 29, 2015 for U.S. Appl. No. 14/177,192.
Office action dated Dec. 18, 2015 for U.S. Appl. No. 14/177,188.
Co-pending U.S. Appl. No. 14/842,736, filed Sep. 1, 2015.
Co-pending U.S. Appl. No. 14/843,815, filed Sep. 2, 2015.
Co-pending U.S. Appl. No. 15/476,549, filed Mar. 31, 2017.
Co-pending U.S. Appl. No. 15/789,917, filed Oct. 20, 2017.
Notice of Allowance dated Jul. 3, 2017 for U.S. Appl. No. 14/842,736.
Notice of Allowance dated Aug. 15, 2017 for U.S. Appl. No. 14/843,853.
Notice of Allowance dated Sep. 27, 2017 for U.S. Appl. No. 14/842,736.
Notice of Allowance dated Oct. 25, 2017 for U.S. Appl. No. 14/843,853.

(56) References Cited

OTHER PUBLICATIONS

Office Action dated Apr. 21, 2017 for U.S. Appl. No. 14/177,188.
Office Action dated May 10, 2017 for U.S. Appl. No. 14/177,192.
Office Action dated May 26, 2017 for U.S. Appl. No. 14/843,815.
Office Action dated Sep. 28, 2017 for U.S. Appl. No. 14/843,815.
Co-pending U.S. Appl. No. 15/811,928, filed Nov. 14, 2017.
U.S. Appl. No. 14/843,815 Notice of Allowance dated Apr. 12, 2018.

* cited by examiner

SYSTEMS AND METHODS FOR DETERMINING AND DISPLAYING A ROUTE USING INFORMATION DETERMINED FROM A VEHICLE, USER FEEDBACK, AND A MOBILE ELECTRONIC DEVICE

CROSS-REFERENCE

This application claims the benefit of U.S. Provisional Application No. 62/044,978, filed Sep. 2, 2014, which application is entirely incorporated herein by reference.

BACKGROUND

Vehicles increasingly rely on computers and sensors for a variety of purposes. With time, the information determined from a vehicle gets more sophisticated, and more comprehensive about a variety of aspects relating to the operation of a vehicle.

Numerous conventional approaches exist for matching a vehicle route to a map, and displaying the vehicle route on a map. Conventional approaches typically rely on global positioning system (GPS) information, with varying levels of accuracy and granularity based on the quality of the GPS information.

SUMMARY

The present disclosure systems and methods for determining and displaying a vehicle route or distance traveled using information determined from the vehicle, user feedback and a mobile electronic device (e.g., mobile phone) that is resident with the vehicle. This can provide various non-limiting benefits, such as, for example, enabling the determining of a route of or distance traveled by a vehicle during at least a portion of a trip when position information (e.g., global positioning system information) is otherwise unavailable.

An aspect of the present disclosure provides a computer-implemented method for determining a route of a vehicle during a trip, comprising obtaining sensor information from a vehicle; obtaining position information from the vehicle using a global positioning system (GPS) component; and determining using one or more programmed computer processors a route of the vehicle based at least in part on the position information and route information provided by a user onboard the vehicle during the trip, and wherein for portions of the trip in which the GPS component is not available or accurate, determining at least a portion of a corresponding route segment using the sensor information without the position information.

In some embodiments, determining at least the portion of the corresponding route segment includes determining an initial route segment and an end route segment using the sensor information.

In some embodiments, determining at least the portion of the corresponding route segment includes using an observation and transition model. In some embodiments, the method further comprises obtaining actual route segments driven by the vehicle during the trip, and subsequently performing a similarity comparison between the actual and predicted route segments to determine a similarity parameter. In some embodiments, the method further comprises updating the model based on the similarity parameter.

In some embodiments, the sensor information includes accelerometer information. In some embodiments, the sensor and/or position information is determined from a mobile computing device that is resident in the vehicle during the trip. In some embodiments, the sensor and/or position information is determined from an onboard device that interfaces with the vehicle to obtain vehicle component data.

In some embodiments, determining at least the portion of the corresponding route segment using the sensor information includes determining a parking location of the vehicle at the end of the trip.

In some embodiments, the method further comprises, for portions of the trip in which the GPS component is not available or accurate, estimating distance traveled for at least the portion of the corresponding route segment.

In some embodiments, the method further comprises using the at least the portion of the corresponding route segment to determine an item of value to the user. In some embodiments, the item of value is money or credit.

In another aspect, a method for determining a route driven by a vehicle over a period of time comprises receiving vehicle data from one or more sensors, wherein the vehicle data comprises sensor data over the period of time; processing the sensor data to obtain one or more data points from the period of time; and using a computer processor to model the one or more data points together with route information provided by a user onboard the vehicle during the trip to obtain the route driven by the vehicle over the period of time.

In some embodiments, the computer processor orients the sensor data in a global reference frame. In some embodiments, the computer processor uses a recurrent neural network to learn rotation matrices over the period of time from the sensor data. In some embodiments, the one or more sensors are on the vehicle. In some embodiments, the one or more sensors comprise at least a global positioning system (GPS) sensor, an accelerometer, a gyroscope, a speed sensor, revolutions-per-minute (RPM) sensor, or a battery voltage sensor. \

In some embodiments, processing the sensor data to obtain the one or more data points from the period of time comprises subsampling the sensor data over the period of time to obtain the one or more data points. In some embodiments, subsampling the sensor data over the period of time to obtain the one or more data points comprises taking a sample from the sensor data at least every three seconds.

In some embodiments, modeling the one or more data points comprises modeling a measurement from each of the one or more sensors independently.

In some embodiments, the method further comprises, in response to modeling the one or more data points to obtain the route, determining one or more errors, and further comprising correcting the one or more errors. In some embodiments, determining the one or more errors comprises determining that the vehicle parked off-street, and wherein correcting the one or more errors comprises truncating the route based on a threshold. In some embodiments, determining the one or more errors comprises detecting a false positive U-turn, which is a U-turn that was detected by the algorithm but not actually made by the driver.

In some embodiments, the method further comprises, in response to modeling the one or more data points to obtain the route, prepending all or part of a prior route by the vehicle to the obtained route, to obtain a modified route.

In another aspect, a non-transitory computer readable medium comprises machine executable code that, upon execution by one or more computer processors, implements any of the methods above or elsewhere herein. In some embodiments, a non-transitory computer-readable medium comprises machine executable code that, upon execution by one or more computer processors, implements a method for determining a route of a vehicle during a trip, the method comprising obtaining sensor information from a vehicle; obtaining position information from the vehicle using a global positioning system (GPS) component; and determining a route of the vehicle based at least in part on the position information and route information provided by a user onboard the vehicle during the trip, and wherein for portions of the trip in which the GPS component is not available or accurate, determining at least a portion of a corresponding route segment using the sensor information.

In another aspect, a system for determining a route of a vehicle during a trip comprises one or more computer processors that are individually or collectively programmed to implement any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
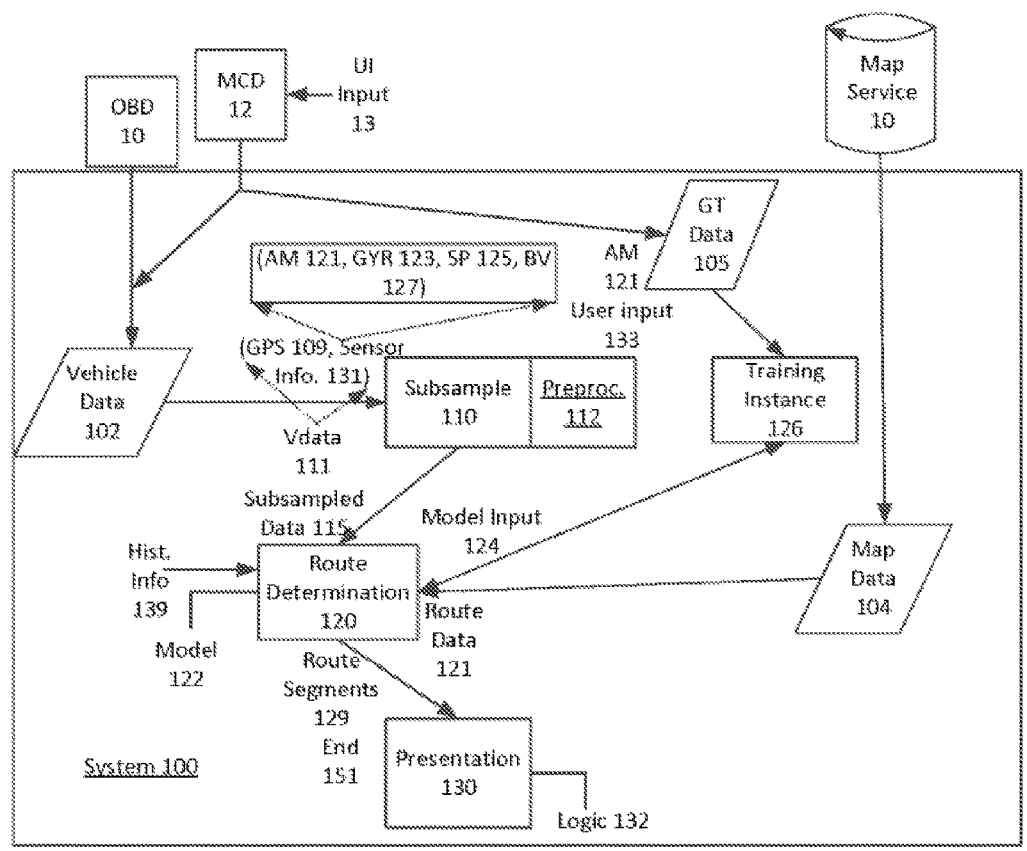
FIG. 1 illustrates a system for using vehicle data to display a vehicle route, according to some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "trip," as used herein, generally refers to an act of traveling from one point to another. A trip can include traveling to a place and returning. A trip can be made with a vehicle, such as a car, truck, motorcycle, scooter, or bicycle. A trip can be made along a route. The route can have one or more start and stop points.

Examples described herein provide an enhanced route determination and mapping system which utilizes one or multiple sensor inputs of a vehicle to overcome at least some of the limitations associated with global position system (GPS). More specifically, examples described herein recognize that conventional approaches to route determination and mapping lose accuracy both at the start of a trip and at its very end, as well as at intermediate locations where GPS fails. At the start of a trip, for example, GPS devices typically are not locked into a signal, while at the end of the trip, the vehicle is often enclosed in a parking garage or other location where GPS is lost or inaccurate. Further, in between the start and end, the GPS devices often encounter deadspots where the GPS data is lost. While conventional approaches to route determination and mapping typically omit useful route information at the start and end of the trip (as well as elsewhere when the GPS signal is lost), embodiments described herein may use sensor information and modeling in order to determine the entire vehicle route, as well as important metrics of the vehicle on a route.

Among other benefits, examples as described herein can enable a complete vehicle route to be determined from start to end (e.g., when the vehicle is parked) with a high degree of precision. As a consequence, examples described herein can provide further useful information to the user, such as information about where the user parked his car, as well as information informing the user about roadways at the start or end of the trip (e.g., recommendations to alternative routes, etc.). Furthermore, the enhanced route determination and mapping can enable more accurate determination of metrics, such as metrics relating to fuel economy and wear and tear.

Vehicle information may be determined telematically using, for example, a combination of geolocation information (e.g., GPS information) and an electronic device (e.g., mobile computing device) in the vehicle. In some examples, a vehicle monitoring device is provided within a vehicle to provide both sensor information and vehicle data. The information is communicated to a service (e.g., network service), or alternatively to a mobile (or portable) computing device, in order to determine route information and further to provide route mapping to the user (e.g., using the mobile computing device of the user). In variations, a mobile computing device resident within the vehicle generates both sensor information and GPS information in order to determine route information and mapping.

Vehicle data may be obtained by one or more sensor on (or onboard) a vehicle. The one or more sensor may be part of the vehicle. As an alternative or in addition to, the vehicle data may be obtained by one or more sensor external to the vehicle or in the vehicle but not part of or removable from the vehicle (e.g., mobile electronic device of a user).

Still further, in implementations described, the route determination and mapping can be determined from sensor information, without GPS. In particular, (i) sensor information can be used to supplement GPS information when the GPS information is not available on a given trip, and/or (ii) sensor information can be used to enhance the GPS information to provide better precision and granularity with respect to the location of the vehicle.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

Methods for determining a route or distance traveled, as disclosed herein, may have various benefits. For example, in situations in which a route and/or distance traveled is used to determine insurance or warranty (e.g., per-mile insurance or warranty of a vehicle), an accurate determination of the route or distance traveled may be used to provide an item of value (e.g., money or credit) to a user that may otherwise be lost when accurate route or distance information is not available.

Systems

FIG. 1 illustrates a system for using vehicle data and modeling to determine a complete route of a vehicle on a trip, according to one or more embodiments. In greater detail, a system 100 is described which develops and tunes an observation and transition model to determine a route of a vehicle during a trip in which there are at least some route segments without the benefit of accurate geographic location (geolocation) data, such as GPS data.

In an embodiment, a system 100 can be implemented in part or in whole as a network service. As a variation, the system 100 can be implemented as a client system (e.g., on a mobile device, such as mobile cellular telephony device or tablet), or alternatively, as a shared platform or functionality between a client and network service.

With reference to FIG. 1, the route determination system 100 includes a subsampling component 110, a route mapping component 120 and a presentation component 130. The route mapping component 120 implements an observation and transition model 122 in order to predict the complete route of a vehicle during a trip. The complete route includes determining segments of the route in which GPS data 109 (or other geolocation data) is unavailable, unreliable or unpredictable, such as the beginning segment(s) and end segment(s) of a trip.

According to some embodiments, the system 100 uses multiple sets of input data for the purpose of modeling and route determination. A first set of input data includes GPS information, which identifies the location of a vehicle when on a trip. A second set of input data includes sensor information, which can include information from a sensor such as an accelerometer, a gyroscope, a magnetometer, etc. The sensor information can include data that is derived from components of the vehicle. A third set of data includes actual route data, which identifies the route segments the vehicle took on a trip when GPS data was unavailable, unreliable or unpredictable. In one implementation, the actual route data can be based on user input. Alternatively, the actual route data can be obtained from an independent or reliable GPS component. As described in greater detail, the GPS and sensor information can be obtained to predictively determine a complete route of a vehicle during a trip using, for example, an observation and transition model.

Accordingly, in one embodiment, an onboard device 10 obtains vehicle data 111 from a vehicle while the vehicle is on a trip. In one implementation, the vehicle data 111 includes GPS information 109, as well as sensor data corresponding to one or more of accelerometer information 121, gyroscope 123, speed 125, and select vehicle component data 127 (collectively "sensor information 131"). By way of the example, the select vehicle component data can include battery voltage, revolutions-per-minute ("RPM") and fuel level. The vehicle component data 127 can be collected from an onboard device 10 that interfaces with the vehicle's own computing system ("vehicle interface device 10") to obtain information such as battery voltage, RPM and fuel level.

In one implementation, the vehicle interface device 10 can include a device that interfaces with internal components of the vehicle in order to obtain On-Board Diagnostic ("OBD") data, such as OBD-II data. Additionally, the vehicle interface data can include additional devices and components, such as a Global Positioning System (GPS) component, as well as sensors such as one or accelerometer(s) or gyroscope(s).

In a variation, some information, such as the accelerometer information 121 and/or speed 125 can be obtained from a mobile computing device 12 (e.g., driver's cell phone), which can be carried within the vehicle. Thus the vehicle data 111 can include data that is generated from both the onboard device 10 and mobile computing device 12. For example, both the onboard device 10 and the mobile computing device 12 can generate sensor information (e.g., accelerometer information 121) that overlaps, and a comparison of the two data sets can provide a more accurate set of sensor information. As another example, the mobile computing device 12 can provide some portions of the vehicle data 111, and the onboard device 10 can provide other portions.

Still further, in another variation, the vehicle data 111 is obtained entirely from the mobile computing device 12, without use of an onboard device 10. For example, in one implementation, the mobile computing device 12 provides accelerometer information 121, as well GPS data 109, and the system 100 omits use of vehicle component data 127 or other data that would otherwise be obtained from an onboard device.

As another addition or alternative, the subsample component 110 interfaces with a profile of the vehicle or driver in order to receive historical information. The historical information can be used as input to tune the observation and transition model 122.

The subsampling component 110 can be implemented as part of a pre-processing sub-system 112. The vehicle data 111 is subsampled at a frequency that is deemed optimal, based on computational time and accuracy. By way of example, the subsample component 110 subsamples to 1 point every 3 seconds. The subsampled data 115 is used by the route mapping component 120.

The route mapping component 120 can access map data 104 from a mapping service 20 (e.g., third-party mapping service). The mapping data 104 can represent a segment of geography corresponding to the determined or predicted location of the vehicle. The route determination component 120 combines the map data 104 with determined locations of the vehicle over the course of a trip in order to determine the route segments 129 of the vehicle.

According to an embodiment, the route determination component 120 uses the observation and transition model 122 (e.g., which can be of a Hidden Markov Model type) to map the subsampled data 115 onto a route being driven (as identified by the mapping data 104) by a vehicle on a trip. The route determination provided by the model 122 includes (i) using sensor information (e.g., acceleration and velocity) when GPS is unreliable or not available to determine portions of segments of the route, and (ii) using sensor information in connection with GPS information to enhance or augment the route determination, so as to provide better precision and granularity as compared to just using the GPS information. The path of the vehicle can be identified through segments, corresponding to, for example, sections of roadway between intersections. At an initial segment corresponding to when the vehicle starts on a trip, examples recognize that the GPS data is not available or precise, and the route determination component 120 applies the observation and transition model 122 to sensor information (acceleration and velocity) in order to determine the initial route segment 129. After the starting segment, the route determination component 120 uses the GPS and the sensor information to determine precise route segments 129 of the vehicle. Additionally, in the middle of the route, when GPS fails (e.g., buildings or mountains present), the route determination component 120 applies the model 122 to the sensor information in order to determine one or more route segment 129 for that portion of the trip. At the end of the trip, examples further recognize that GPS can fail (e.g., user parks in building), and the route determination component 120 uses the model 122 with the sensor information in order to determine a precise end location 151 of the vehicle (e.g., location on a street block where the vehicle is parked, specific parking space or cluster of parking space).

As mentioned, the model 122 implemented by the route mapping component 120 can be an observation and transition model that treats each sensor or component element of the vehicle data 111 (e.g., GPS information 109, accelerometer information 121, gyroscope 123, speed 125, and vehicle component data 127 (e.g., battery voltage and fuel level)) independently, except when the components reflect measurements of physically intertwined quantities (such as acceleration, velocity, and position). According to one or more embodiments, each independent measurement (or group of dependent measurements) is modeled with the assumption that the measurement changes in a fluid manner from timestamp to timestamp, with rate parameter hand-tuned based on visual quality of results. Further, the model 122 treats each sensor as a noisy channel, most commonly with Gaussian IID (Independently Identically Distributed) noise.

Figure 3:
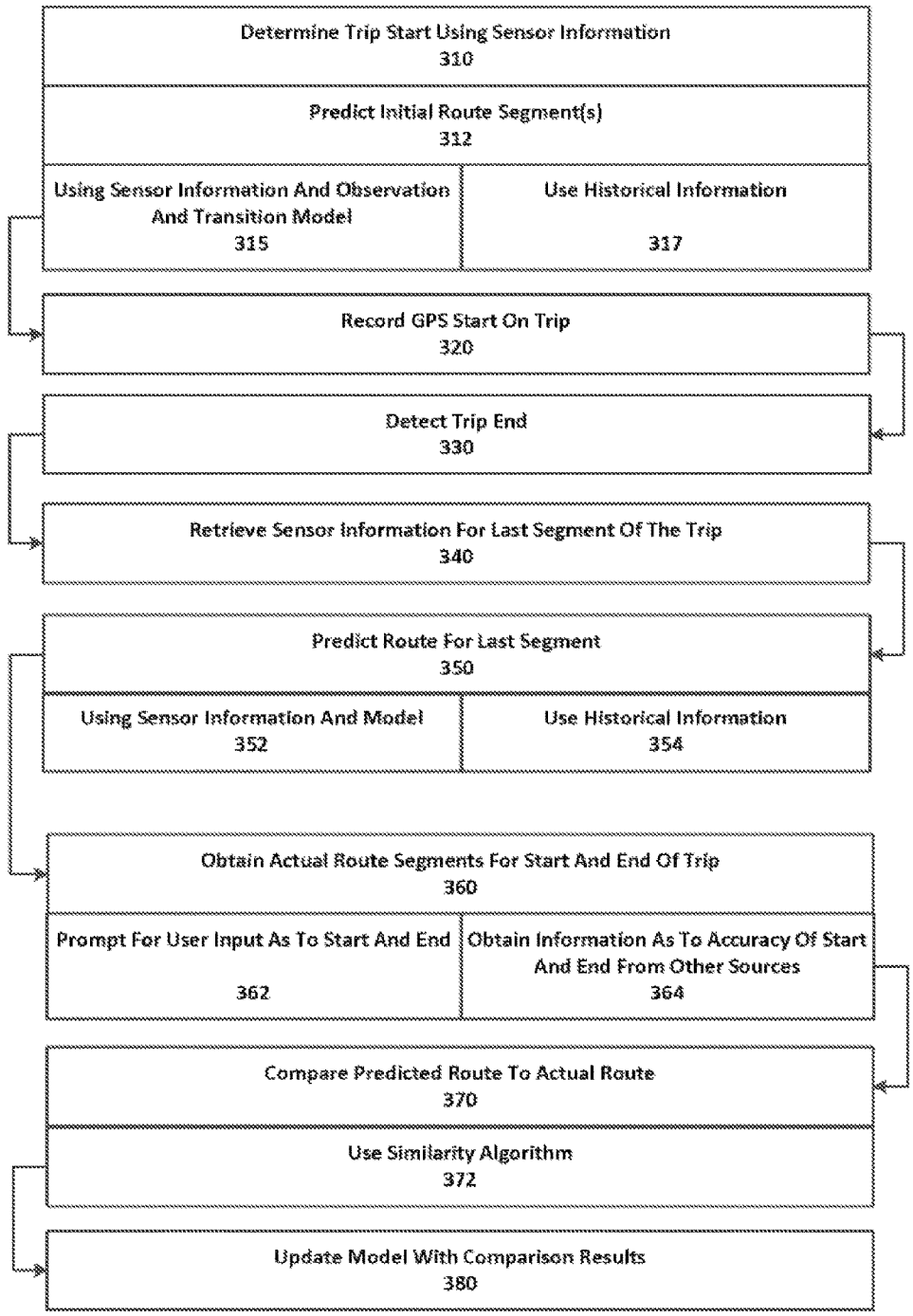
FIG. 3 illustrates an example of a method for determining a route based at least in part on sensor information, according to some embodiments.

As described with an example of FIG. 3, the route determination component 120 can also use historical information 139 in order to determine beginning or end points (or segments) of a given trip. The historical information can provide input that can, for example, provide basis for a predictive determination of the beginning or end to a trip.

The presentation component 130 can receive route segments 129 and end point 151 from the route determination component 120. The presentation component can aggregate the route segments 129 and end point 151 into a route for the travel, with map content provided from the mapping data 104. The presentation component 130 can also perform post-processing functions in order to ready the determined route for display. In one implementation, the presentation component 130 cleans up obvious anomalies in providing an output 139 based on the route segments 129 and end point 151. The output 139 can correspond to a map with better tracking and visualization as to the progress of the user's vehicle on a map.

Logic 132 can also be provided for specific situations. In particular, errors due to parking off-street are truncated using a threshold for moving average of (difference between HMM-output distance and raw-GPS distance). As an addition or alternative, in one implementation, the shortest route from the end of the previous trip to the first valid GPS coordinate is prepended if it is short enough. Furthermore, actions such as U-turns and other anomalies are detected and deleted using, for example, hand-tuned heuristic algorithms.

According to some embodiments, system 100 can train the observation and transition model 122 for purpose of enabling better predicted route segments from sensor information. In one embodiment, the predicted route segments 129 as determined from the route determination component 120 can be compared to actual route segments. The actual route segments can be determined from, for example, user input (or feedback). For example, the mobile computing device 12 of the user can include a user interface that displays the predicted route segments 129 of a trip to the user, and the user interface can prompt the user to provide input that either confirms the predicted route segment is correct, or shows the predicted route to be incorrect by providing the true route taken. Additionally, even when GPS is available the route determination component can use the model 122 with sensor information in order to predict the route segments. Thus, when GPS data is available, the route determination component 120 can generate a prediction of the corresponding route segments 129 using the sensor data, and the predicted route segments can be correlated to GPS information from the GPS component.

The mobile computing device 12 can include a user interface, such as a graphical user interface (GUI). The user interface can present information to a user, such as, for example, the predicted route segments 129. The user interface can be a passive display or an active touch display (e.g., a capacitive or resistive touch screen).

Both the GPS data and the user input can comprise ground truth data 105. A training instance 126 of the route determination component can utilize the ground truth data 105 to update and tune the model 122. Thus, for example, the training instance 134 can be used to generate model inputs 124 to the observation and transition model 122. An example of implementing training is shown with FIG. 3.

Sensor data may be oriented in a global reference frame. In some examples, this is performed using a recurrent neural network to learn rotation matrices over a period of time from the sensor data. The recurrent neural network may include a non-linear Kalman filter. The sensor data may include accelerometer data and/or gyroscope data.

Methods

Figure 2:
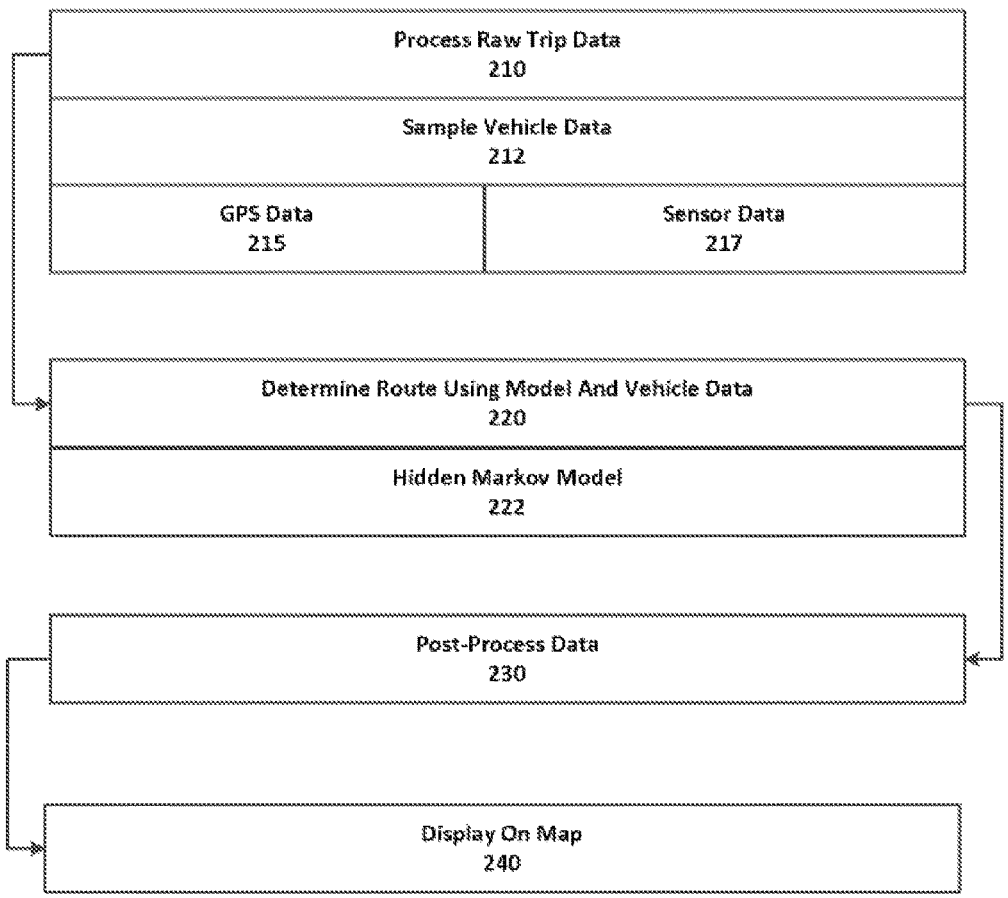
FIG. 2 illustrates an example method for using vehicle data to display a vehicle route, according some embodiments.

FIG. 2 illustrates an example method for using vehicle data to display a vehicle route, according to an embodiment. FIG. 3 illustrates an example of a method for determining a route based at least in part on sensor information, according to another embodiment. A method such as described with an example of FIG. 2 or FIG. 3 can be implemented using, for example, a system such as described with an example of FIG. 1. Accordingly, reference may be made to an example of FIG. 1 for purpose of illustrating suitable components for performing a step or sub-step being described.

With further reference to an example of FIG. 2, raw trip data is processed for a given vehicle while the vehicle is in motion (210). The processing of the raw trip data can include subsampling the vehicle data (212). The raw trip data can be provided by vehicle data 111, which can include the GPS information 109 (215) and the various kinds of sensor information 131 (217). Examples of vehicle data are provided in U.S. Patent Publication Nos. 2015/0226563 and 2015/0228129, each of which is entirely incorporated herein by reference. Particularly relevant are GPS, accelerometer, gyroscope, speed, battery voltage (and other sensors that tell us whether the car is on), heading, and historical trip data. In some variations, the raw trip data is based on accelerometer and velocity readings, without the use of GPS or other sensor information 131. Further, in some implementations, the raw trip data can be obtained from a mobile computing device.

The sampled data is mapped onto route segments which can be provided from map data 104 (220). A Hidden Markov Model can be used to map the raw data onto route segments (222). In one implementation, the Hidden Markov Model can be used to transition the vehicle on its route. The Hidden Markov Model treats each sensor independently, except where they measure physically intertwined quantities (such as acceleration, velocity, and position). The Hidden Markov Model can be implemented to treat each sensor as a noisy channel, most commonly with Gaussian IID (Independently Identically Distributed) noise.

After modeling, the resulting trip is post-processed to clean up any obvious anomalies (230). The resulting data is displayed on a map (240). Among other features, errors due to parking off-street are truncated using a threshold for moving average of {difference between HMM-output distance and raw-GPS distance}. The shortest route from the end of the previous trip to the first valid GPS coordinate is prepended if it is short enough. Additionally, U-turns and other anomalies are detected and deleted using hand-tuned heuristic algorithms.

With reference to FIG. 3, a vehicle trip start is detected (310). The trip start can be detected by, for example, the route determination component 120 using data provided from one of multiple possible sources. The route determination component 120 can operate as part of a network service, or alternatively as a component on the mobile computing device of the user. In an implementation in which the vehicle carries an onboard device 10, the trip start can be detected from vehicle component data 127 or sensor data. In a variation, a mobile computing device is used in absence of an onboard device 10 for purpose of providing sensor data that indicates a trip start. The sensor information 131 can correspond to, for example, accelerometer information and/or velocity, based on the sensor components that are typically available on a mobile computing device.

Embodiments recognize that GPS components are not operational or accurate at the trip start, as GPS components typically require a measure of time to lock into a signal. As a consequence, the initial segments of a trip are typically without GPS. Accordingly, an embodiment provides that the initial route segment(s) are predicted by the route determination component 120 (312). In one implementation, route determination component 120 uses sensor information 131 and the observation and transition model 122 in order to predict the initial route segment(s) of the vehicle (315). The sensor information 131 can include accelerometer information 121 and velocity, which can be obtained from either an onboard device 10 or a mobile computing device. In variations, additional sensor information 131 can be obtained. For example, a gyroscope, magnetometer, or altimeter can be provided with an onboard device 10 in order to obtain additional sensor information 131 which can be used for the observation and transition model 122. Still further, vehicle component data 127 can be obtained from, for example, the vehicle interface device. The vehicle component data 127 can also be used to provide data for the model 122. In such implementations, the observation and transition model 122 can predict the route segment of the vehicle at the trip start.

As an addition or alternative, the route determination component 120 uses historical information to determine the initial route segments (317). For example, the start point of the trip can coincide with the determined end point of the immediate prior trip, provided that certain conditions are met, such as the first detected GPS point of the current trip being within a threshold distance of the determined end point of the immediately prior trip. Alternatively, the historical information can identify the most likely start point of the trip based on recorded historical information.

After the trip start is initiated, the GPS component can operate to provide position information for use in determining the route of the vehicle (320). In one implementation, the route determination component 120 can implement observation and transition model 122 with the sensor information 131 (e.g., accelerometer) to increase the precision and granularity of the position information provided from the GPS component. In one implementation, the observation and transition model 122 detects when the position information and the predicted route provide a common route, and the two outputs are then used to provide a single augmented or enhanced route determination.

The route determination component can receive data that indicates the vehicle has parked, marking the end of the trip (330). For example, in one implementation, the onboard device may communicate that the vehicle has been shut off. In a variation, the user may provide input that indicates the trip is over.

When the end of the trip is detected, sensor information 131 for the last segment of the trip is retrieved (340). In one implementation, sensor information 131 is continuously recorded for the trip, and when the trip is detected as being over, the sensor information 131 for the last segment is retrieved from the larger set of recorded sensor information 131 for the trip.

The route determination component 120 determines route information for the last segment of the route (350). More specifically, the route determination component 120 can implement the observation and transition model 122, using sensor data from the last segment of the trip (352). In one implementation, the route determination component 120 can implement the model 122 to determine, for example, the parking position or region of the vehicle in a street, or the pinpoint location of the vehicle in a parking lot or garage. The use of sensor information 131 in this manner enables a more granular and precise determination of vehicle location at the end of trip. The route determination component 120 uses the observation and transition model 122 in order to predict route segments, particularly at times when the position information from the GPS component is not reliable or present.

As an alternative or addition, the route determination component 120 uses historical information to determine information for the last segment of the route (354). For example, the route determination component 120 can determine the last segment of prior trips, and based on the last GPS data, determine the last segment of the trip based on historical information. For example, the GPS information can predict that the trip will end at a work location for the user based on determined GPS information, with the last segment being predicted.

In an embodiment, the system 100 obtains the actual route of the vehicle at the predicted route segments (360). For example, the mobile computing device of the user may be provided an application that displays to the driver the route segments of a route which were predicted from sensor information 131. In turn, the driver can provide input indicating the actual route taken (362). For example, the driver can mark the road segment or segments taken at the start of the trip using a touch sensitive input. In a variation, an alternative source of position information, such as the GPS component of the mobile computing device, can be used to determine the actual vehicle position in the durations when the predicted route segments took place (364).

When the actual route segments are determined, the system 100 uses a comparison of the predicted route segments and the actual route segments to tune the observation and transition model 122 (370). In one implementation, the actual route information can be used as ground truth data for use with the training instance 126 of the model implementation. A similarity comparison can be implemented between the predicted and actual route segments in order to tune the model 122 (372).

In one implementation, the similarity comparison can be made using a Jaccard Similarity algorithm. In a Jaccard Similarity algorithm, a similarity metric can be determined that corresponds to a ratio of the size of the intersection between the predicted and actual routes and the size of the union of the predicted and actual routes. For example, sensor information 131 can be continuously used in order to determine a predictive route using the observation and transition model 122. Likewise, the actual route can be determined from the GPS component (e.g., for route segments between the beginning and end of the trip) and/or from user input. The user input can be received, for example, at the end of the trip when predicted route segments are displayed to the user and the user provides input confirming or correcting the predicted route segment. The size of the intersection of the actual route segments and the predicted route segments can correspond to a first distance. The size of the union of the actual and predicted route segments can also provide a second distance. The ratio of the first distance and the second distance (i.e., the intersection and union) can be 1 when the predicted and actual route segments are exactly the same. When the similarity is determined, the model 122 is updated (e.g., re-weighted) so that the similarity metric approaches 1 (380).

Computer Systems

Figure 4:
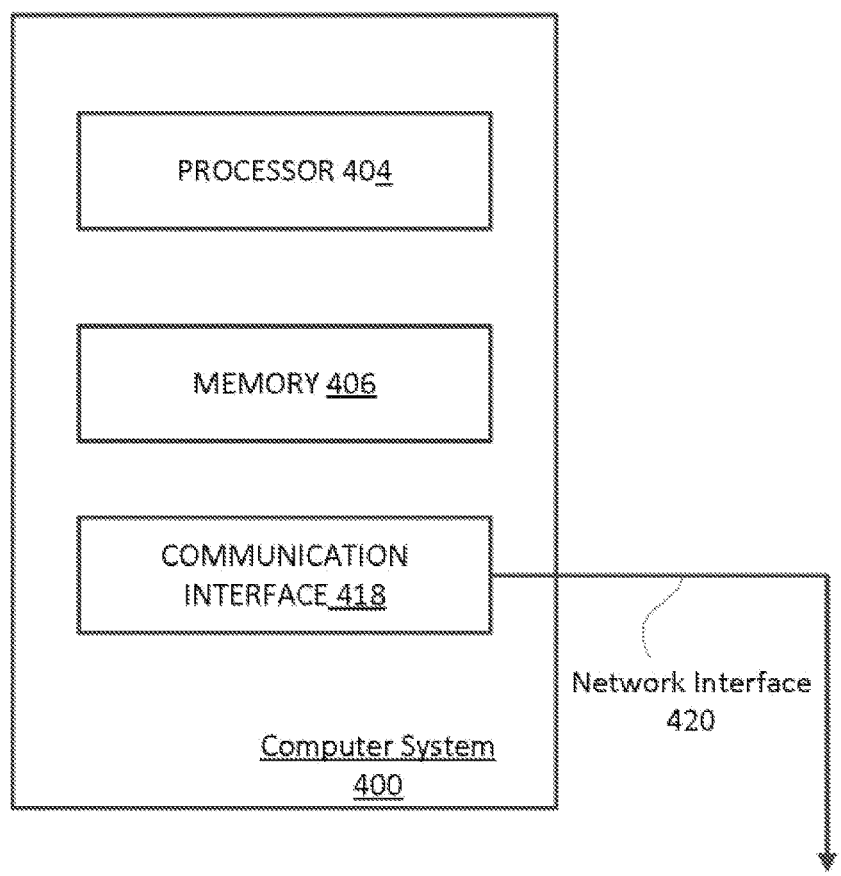
FIG. 4 illustrates a computer system on which some embodiments may be implemented.

FIG. 4 is a block diagram that illustrates a computer system upon which embodiments described herein may be implemented. For example, a system such as described with FIG. 1 can be implemented on a computer system such as described with an example of FIG. 4. Likewise, a method such as described with an example of FIG. 2 or FIG. 3 can also be implemented using a system such as described with FIG. 1.

In an embodiment, computer system 400 includes processor 404, memory 406 (including non-transitory memory), storage device, and communication interface 418. The memory 406 can include random access memory (RAM) or other dynamic storage resources, for storing information and instructions to be executed by processor 404. The memory 406 also may be used for storing temporary variables or other intermediate information during execution of instructions to be executed by processor 404. The memory 406 may also include a read only memory (ROM) or other static storage device for storing static information and instructions for processor 404. A storage device, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 1, or implemented through an example method such as described with FIG. 2 or FIG. 3. Likewise, the processor 404 may execute the instructions in providing functionality as described with a system such as described with FIG. 1, or with methods such as described with FIG. 2 or FIG. 3.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device. Execution of the sequences of instructions contained in main memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Figure 5:
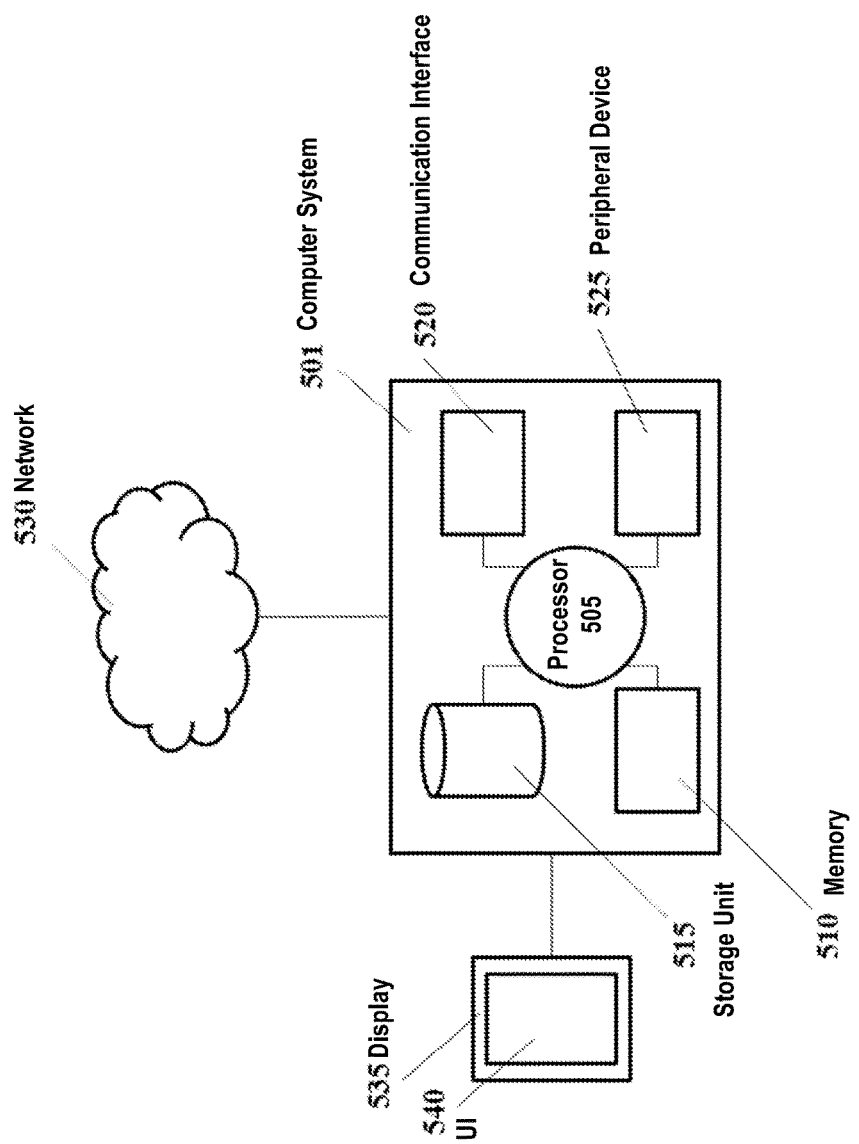
FIG. 5 schematically illustrates a computer system that is programmed or otherwise configured to implement methods of the present disclosure.

FIG. 5 shows another computer system 501 that is programmed or otherwise configured to implement methods and systems of the present disclosure, such as determining a route of a vehicle during a trip. The computer system 501 can regulate various aspects of methods and systems of the present disclosure. The computer system 501 can be a computer server.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., operator or passenger of a vehicle). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a route of a vehicle during a trip. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine and provide a route of a vehicle during a trip. The algorithm may be a machine learning algorithm (e.g., support vector machine), which may use user feedback (e.g., user input with respect to route segments) to improve the determination of a route of a vehicle during a trip. The UI 540 may include graphical elements that permit the user to provide feedback. For example, the computer system 501 may query and/or receive from the user information about route segments. This can permit the computer system 501 to use the feedback to improve the manner in which the computer system 501 determines a route of a vehicle during a trip.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for determining a route of a vehicle during a trip, comprising:
    (a) obtaining sensor information from the vehicle;
    (b) obtaining position information from the vehicle using a global positioning system (GPS) component;
    (c) calculating using one or more programmed computer processors a route of the vehicle based at least in part on (i) the position information using the GPS component and (ii) sensor information without the position information for portions of the trip in which the GPS component is not available or accurate; and
    (d) providing the route calculated in (c) to a user onboard the vehicle during the trip to confirm or correct one or more portions of the route calculated using the sensor information; and
    (e) receiving confirmation or correction, from user input, of the one or more portions of the route calculated using the sensor information.

2. The method of claim 1, wherein the portions of the trip in which the GPS component is not available or accurate are calculated based on an initial route segment and an end route segment using the sensor information.

3. The method of claim 1, wherein the portions of the trip in which the GPS component is not available or accurate are calculated using an observation and transition model.

4. The method of claim 3, further comprising performing a similarity comparison between the portions of the trip in which the GPS component is not available or accurate and the one or more portions of the route confirmed or corrected b the user to determine a similarity parameter.

5. The method of claim 4, further comprising updating the observation and transition model based on the similarity parameter.

6. The method of claim 1, wherein the sensor information includes accelerometer information.

7. The method of claim 6, wherein the sensor and/or position information is determined from a mobile computing device that is resident in the vehicle during the trip.

8. The method of claim 6, wherein the sensor and/or position information is determined from an onboard device that interfaces with the vehicle to obtain vehicle component data.

9. The method of claim 1, wherein some of the portions of the trip in which the GPS component is not available or accurate are calculated using a parking location of the vehicle at the end of the trip.

10. The method of claim 1, further comprising, for portions of the trip in which the GPS component is not available or accurate, estimating distance traveled for at least the one or more portions of the route calculated using the sensor information.

11. The method of claim 1, further comprising using the one of more portions of the route calculated using the sensor information to determine an item of value to the user.

12. The method of claim 11, wherein the item of value is money or credit.

13. A method for determining a route driven by a vehicle over a period of time, comprising:
    (a) receiving vehicle data from one or more sensors, wherein the vehicle data comprises sensor data over the period of time;
    (b) processing the sensor data to obtain one or more data points from the period of time;
    (c) using a computer processor to model the one or more data points to calculate the route driven by the vehicle over the period of time; and
    (d) providing the route calculated in (c) to a user onboard the vehicle during the trip to determine one or more errors with the route; and
    (e) receiving user input indicating one or more errors with the route calculated in (c).

14. The method of claim 13, wherein the computer processor orients the sensor data in a global reference frame.

15. The method of claim 13, wherein the one or more sensors are on the vehicle.

16. The method of claim 13, wherein the one or more sensors comprise at least a global positioning system (GPS) sensor, an accelerometer, a gyroscope, a speed sensor, revolutions-per-minute (RPM) sensor, or a battery voltage sensor.

17. The method of claim 13, wherein processing the sensor data to obtain the one or more data points from the period of time comprises subsampling the sensor data over the period of time to obtain the one or more data points.

18. The method of claim 17, wherein subsampling the sensor data over the period of time to obtain the one or more data points comprises taking a sample from the sensor data at least every three seconds.

19. The method of claim 13, wherein modeling the one or more data points comprises modeling a measurement from each of the one or more sensors independently.

20. The method of claim 13, further comprising correcting the one or more errors.

21. The method of claim 20, wherein the one or more errors are caused by the vehicle being parked off-street, and wherein correcting the one or more errors comprises truncating the route based on a threshold.

22. The method of claim 20, wherein determining the one or more errors comprises detecting a false positive U-turn, which is a U-turn that was detected by the algorithm but not actually made by the driver.

23. The method of claim 13, further comprising, in response to modeling the one or more data points to obtain the route, prepending all or part of a prior route by the vehicle to the obtained route, to obtain a modified route.

24. A non-transitory computer-readable medium comprising machine executable code that, upon execution by one or more computer processors, implements a method for determining a route of a vehicle during a trip, the method comprising:
- (a) obtaining sensor information from the vehicle;
- (b) obtaining position information from the vehicle using a global positioning system (GPS) component; and
- (c) calculating a route of the vehicle based at least in part on (i) the position information using the GPS component and (ii) sensor information without the position information for portions of the trip in which the GPS component is not available or accurate; and
- (d) providing the route calculated in (c) to a user onboard the vehicle during trip to confirm or correct one or more portions of the route calculated using the sensor information; and
- (e) receiving confirmation or correction, from user input, of the one or more portions of the route calculated using the sensor information.

* * * * *

UNITED STATES PATENT AND TRADEMARK OFFICE
CERTIFICATE OF CORRECTION

PATENT NO. : 10,036,639 B1
APPLICATION NO. : 14/842753
DATED : July 31, 2018
INVENTOR(S) : Evan Gabriel Turitz Cox et al.

Page 1 of 1

It is certified that error appears in the above-identified patent and that said Letters Patent is hereby corrected as shown below:

In the Claims

Column 15, Line 63 Claim 1:
Delete "and" after "accurate;"
Column 16, Line 51 Claim 13:
Delete "and" after "time;"
Column 18, Line 8 Claim 24:
Delete "and" after "component;" and
Column 18, Line 14 Claim 24:
Delete "and" after "accurate;"

Signed and Sealed this
Fourth Day of September, 2018

Andrei Iancu
*Director of the United States Patent and Trademark Office*